United States Patent
Shore et al.

(10) Patent No.: US 6,913,739 B2
(45) Date of Patent: Jul. 5, 2005

(54) PLATINUM GROUP METAL PROMOTED COPPER OXIDATION CATALYSTS AND METHODS FOR CARBON MONOXIDE REMEDIATION

(75) Inventors: Lawrence Shore, Edison, NJ (US); Wolfgang F. Ruettinger, East Windsor, NJ (US); Robert J. Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 530 days.

(21) Appl. No.: 10/035,525

(22) Filed: Nov. 9, 2001

(65) Prior Publication Data

US 2002/0122764 A1 Sep. 5, 2002

Related U.S. Application Data

(63) Continuation-in-part of application No. 09/771,812, filed on Jan. 29, 2001, now abandoned, which is a continuation-in-part of application No. 09/669,044, filed on Sep. 25, 2000, now abandoned.

(51) Int. Cl.$^7$ .............................................. C01B 31/20
(52) U.S. Cl. ..................................... 423/247; 423/437.2
(58) Field of Search ........................... 423/247, 437 M, 423/437.2

(56) References Cited

U.S. PATENT DOCUMENTS

| | | | |
|---|---|---|---|
| 3,914,377 A | * 10/1975 | Anderson et al. ........... 423/247 |
| 3,922,337 A | 11/1975 | Campbell et al. | |
| 4,492,770 A | 1/1985 | Blanchard et al. .......... 502/304 |
| 4,711,773 A | 12/1987 | Mesters et al. | |
| 4,939,292 A | 7/1990 | Elliott et al. ................ 560/239 |
| 4,991,181 A | * 2/1991 | Upchurch et al. .......... 423/247 |
| 4,996,180 A | 2/1991 | Diwell et al. | |
| 5,030,440 A | 7/1991 | Lywood et al. | |
| 5,063,193 A | 11/1991 | Bedford et al. | |
| 5,290,530 A | 3/1994 | Muramatsu et al. ...... 423/239.1 |
| 5,830,425 A | 11/1998 | Schneider et al. ........ 423/437.2 |
| 5,877,377 A | 3/1999 | Golunski et al. | |
| 5,990,040 A | 11/1999 | Hu et al. | |
| 6,238,640 B1 | 5/2001 | Eguchi et al. ............ 423/437.2 |
| 6,492,298 B1 | * 12/2002 | Sobukawa et al. .......... 423/247 |

(Continued)

FOREIGN PATENT DOCUMENTS

| | | | |
|---|---|---|---|
| EP | 1 136 442 A2 | 9/2001 | ............. C01B/3/16 |
| JP | 11-114423 | 4/1999 | ............ B01J/23/63 |
| JP | 2001/199706 | 7/2001 | |
| WO | WO 00/41799 | 7/2000 | |
| WO | WO 00/66486 | 11/2000 | |
| WO | WO 01/17681 A2 | 3/2001 | |
| WO | WO 01/47806 A1 | 7/2001 | |
| WO | WO 01/60738 A2 | 8/2001 | |

OTHER PUBLICATIONS

Applied Catalysis B: Environmental 4 (1994) 105–140 (Barbier). Steam effects in three–way catalysis.

(Continued)

*Primary Examiner*—Wayne A. Langel
(74) *Attorney, Agent, or Firm*—Russell G. Lindenfeldar

(57) ABSTRACT

The invention provides processes for selectively oxidizing carbon monoxide from an input gas stream that contains carbon monoxide, oxygen and hydrogen. The process includes the step of contacting the input gas stream with a preferential oxidation catalyst. The preferential oxidation catalysts are copper-based catalysts containing low concentrations of platinum group metals. In some embodiments, the processes of the invention are conducted using preferential oxidation catalysts having an oxide support on which is dispersed copper or an oxide thereof, a platinum group metal and a reducible metal oxide. In other embodiments, the processes of the invention are conducted with a preferential oxidation catalysts having a cerium oxide support on which is dispersed copper or an oxide thereof and a platinum group metal.

21 Claims, 3 Drawing Sheets

U.S. PATENT DOCUMENTS

| | | | |
|---|---|---|---|
| 6,531,105 B1 * | 3/2003 | Giacobbe et al. | 423/247 |
| 6,548,034 B2 | 4/2003 | Takamura et al. | 423/247 |
| 6,555,088 B1 | 4/2003 | Baumann et al. | 423/656 |
| 6,723,298 B1 * | 4/2004 | Baumann et al. | 423/437.2 |
| 2004/0156770 A1 * | 8/2004 | Hocevar et al. | 423/247 |

OTHER PUBLICATIONS

Catalysis Letters 50 (1998) 41–48 (Park) The influence of surface structure on the catalytic activity of cerium promoted copper oxide catalysts on alumina: oxidation of carbon monoxide and methane.

Catal. Rev. Sci. Eng., 21(2), 275–318 (1980) Newsome, The Water–Gas Shift Reaction.

Applied Catalysis B: Environmental, 3 (1993) 61–83, Reactivity of steam in exhaust gas catalysis, (Barbier).

U.S. Appl. No. 10/035,549, filed Nov. 9, 2001, Ruettinger, et al.

U.S. Appl. No. 10/035,575, filed Nov. 9, 2001, Shore, et al.

U.S. Appl. No. 10/039,447, filed Nov. 9, 2001, Ruettinger, et al.

Catalysis Letters. 73(1): 33–40, 2001 (Avgouropoulos). CuO–CeO2 mixed oxide catalysts for the selective oxidation of carbon monoxide in excess hydrogen, (no month).

Applied Catalysis A: General: 194–195, 2000 (Utaka). CO removal by oxygen–assisted water gas shift reaction over supported Cu catalysts, (no month).

* cited by examiner

PLATINUM GROUP METAL PROMOTED COPPER OXIDATION CATALYSTS AND METHODS FOR CARBON MONOXIDE REMEDIATION

This application is a continuation-in-part of U.S. patent application Ser. No. 09/771,812, filed Jan. 29, 2001, now abandoned which is a continuation-in-part of U.S. patent application Ser. No. 09/669,044 filed Sep. 25, 2000, now abandoned. The disclosures of both of these applications are incorporated herein by reference as if fully set forth herein.

The present invention relates to preferential oxidation catalysts and methods for the selective oxidation of carbon monoxide in gas streams containing high concentrations of hydrogen. More particularly, the invention relates to copper catalysts that contain low levels of platinum group metals that stabilize the catalyst composition against deactivation that typically occurs in copper-based catalysts at lower temperatures e.g., below about 140° C. The catalysts and methods of the invention are useful, for example, for removing carbon monoxide in hydrogen feed streams supplied to fuel cells, particularly to proton exchange membrane (PEM) fuel cells.

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and nitric oxides. Fuel cell-powered vehicles which reform hydrocarbons to power the fuel cell generate less carbon dioxide (green house gas) and have enhanced fuel efficiency.

Fuel cell processors (also known as fuel cell reformers) supply a hydrogen-containing gas stream to the fuel cell. Fuel cell processors include reactors that steam reform hydrocarbon feedstocks (e.g., natural gas, LPG) and hydrocarbon derivatives (e.g., alcohols) to produce a process stream enriched in hydrogen. Other by-products from the steam reforming of hydrocarbon include carbon monoxide and carbon dioxide. Fuel cell processors further include shift reactors where the hydrogen content of the process stream is further enriched by reaction of carbon monoxide in the water-gas shift reaction:

$$CO + H_2O \leftrightarrows CO_2 + H_2$$

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In typical PEM fuel cell operation, hydrogen gas is electrolytically oxidized to hydrogen ions at the anode composed of platinum reaction catalysts deposited on a conductive carbon electrode. The protons pass through the ion exchange resin membrane, which can be a fluoropolymer of sulfonic acid called a proton exchange membrane. $H_2O$ is produced when protons then combine with oxygen that has been electrolytically reduced at the cathode. The electrons flow through an external circuit in this process to do work, creating an electrical potential across the electrodes. Examples of membrane electrode assemblies and fuel cells are described in U.S. Pat. No. 5,272,017.

The platinum electrodes at the anode are extremely sensitive to carbon monoxide in the hydrogen feed stream supplied to the fuel cell. Even levels below 100 ppm of carbon monoxide can cause deterioration of the platinum and consequently, adversely affect fuel cell performance. It is therefore desirable to reduce the levels of carbon monoxide in the hydrogen feed stream supplied to the fuel cell to as low a level as practical. Preferably, the level of carbon monoxide in the hydrogen feed stream ultimately supplied to the fuel cell is below 100 ppm, more preferably below 10 ppm.

Levels of carbon monoxide as low as these are difficult to achieve by using the water-gas shift reactor alone, and so additional carbon monoxide purifying measures are typically used. One well-known method utilized to lower the levels of carbon monoxide in hydrogen feed streams includes treatment with "preferential oxidation catalysts" (also known as "Prox" catalysts). These catalysts selectively oxidize residual carbon monoxide in hydrogen gas streams according to the following reaction:

$$CO + \tfrac{1}{2}O_2 \rightarrow CO_2$$

wherein hydrogen may comprise greater than 60% by volume or more of the gas stream composition. An undesirable side reaction in this method is therefore the oxidation of hydrogen according to the following reaction:

$$H_2 + \tfrac{1}{2}O_2 \rightarrow H_2O.$$

In order to consume as little hydrogen as possible, it is preferable that the preferential oxidation process be as selective as possible for the oxidation of carbon monoxide. Some of the factors that influence the selectivity of the oxidation process include the composition of the input gas stream used in the process, the temperature of the reaction, the space velocity of the input gas stream and the composition of the preferential oxidation catalyst.

Some of the more effective preferential oxidation catalysts, used in purifying hydrogen feed streams in fuel reformers, are platinum-based catalysts, e.g., platinum on an alumina support. While effective at catalyzing the selective oxidation at temperatures above the dew point of the reformate gas stream, achieving levels of carbon monoxide below 10 ppm in gas streams containing high hydrogen content is difficult to accomplish. It is believed that levels of carbon monoxide below 10 ppm cannot be reached due to the reverse water-gas shift activity exhibited by the platinum-based catalysts. At the low space velocities of the input gas stream necessary to reach the equilibrium carbon monoxide concentration, the long residence time and the high concentration of hydrogen and carbon dioxide contribute to favor the reverse water-gas shift and the detrimental formation of carbon monoxide. An additional liability is the expense of including catalytically effective amounts of costly platinum in the catalyst composition.

An alternative preferential oxidation catalyst is a catalyst containing ruthenium as a catalytic agent, e.g., ruthenium on an alumina support. The ruthenium-based catalyst does not catalyze the reverse water-gas shift reaction, and hydrogen feed streams with levels of carbon monoxide below 10 ppm can be achieved. The temperatures at which the selective oxidation processes using a ruthenium-based catalyst are operated, however, are also favorable for the methanation reaction that occurs with carbon monoxide as shown below $$CO + 3H_2 \rightarrow CH_4 + H_2O$$

This undesired side reaction sacrifices three moles of hydrogen for each mole of carbon monoxide converted to methane. Methanation may also occur under these conditions with carbon dioxide according to the equation shown below:

$$CO_2 + 4H_2 \rightarrow CH_4 + 2H_2O.$$

In this side reaction four moles of hydrogen are consumed for each mole of carbon dioxide converted to methane. In addition, ruthenium is a costly, precious metal that is in limited supply.

Less costly preferential oxidation catalysts employ base metals as preferential oxidation catalysts in fuel cell reformers. For example, a copper/cerium oxide catalyst composition has been described in WO 01/60738 to catalyze the selective oxidation of carbon monoxide in hydrogen feed streams. The performance characteristics of the catalyst are not described in the presence of steam in this publication, however, a paper [Avgouropoulis et al. *Catalysis Letters* 2001, 73, 33] described the effect of 10% steam on the performance of these catalysts. To obtain a given level of carbon monoxide conversion in the presence of steam, a 20–40° C. increase in operating temperature was needed under dry conditions. Exposure to high steam conditions are an intrinsic part of fuel cell processor operation.

In addition, these copper-based catalyst typically operate at higher temperatures however, which typically result in lower selectivity. The selectivity of the reduction can be improved by decreasing the reaction temperature, however, the catalyst is prone to deactivation when the temperature drops below about 140° C. Such temperature drops are common in fuel cell applications since power demands for fuel cells vary considerably depending on the application. Preferential oxidation catalysts for incorporation into fuel cell processors are therefore preferably designed to withstand such temperature drops that are characteristic of transient operation.

SUMMARY OF THE INVENTION

In one aspect, the invention relates to a preferential oxidation catalyst for the oxidation of carbon monoxide to carbon dioxide in the presence of excess hydrogen. The preferential oxidation catalyst has at least 50 wt. % of an oxide support that contains activated alumina, zirconia, titania, silica, zeolites and combinations thereof. Preferred supports include activated alumina. Dispersed on the oxide support is copper or an oxide thereof, a platinum group metal and a reducible metal oxide.

Preferably there is at least 5 wt. % or more of copper in the preferential oxidation catalyst.

The platinum group metal is selected from the group consisting of platinum, palladium, rhodium, osmium, iridium, ruthenium and combinations thereof, and is preferably in a concentration range of 0.01 to 0.5 wt. % of the catalyst composition. A preferred platinum group metal is platinum.

The reducible metal oxide is preferably selected from the group consisting of oxides of chromium, vanadium, molybdenum, cerium, praseodymium, neodymium, titanium, nickel, manganese, cobalt, and combinations thereof. Preferred preferential oxidation catalysts contain cerium oxide in the composition. The preferential oxidation catalysts preferably contain at least 10 wt. % of the reducible metal oxide.

In a particularly preferred embodiment of the invention, the preferential oxidation catalyst has at least 65 wt. % of an alumina support. Dispersed on the support are: 5 to 14 wt. % of copper or an oxide thereof, 0.01 to 0.5 wt. % of platinum, and 10 to 25 wt. % of cerium oxide.

In some embodiments the catalyst is in the form of support particles having a mesh size of 12 or greater, and a BET surface area of 10 m²/g or greater. The support particles preferably are durable and possess high mechanical strength. In other embodiments the preferential oxidation catalyst is in the form of a washcoat composition deposited on a monolith substrate. The catalyst can also take the form of extrudates or tablets.

In another aspect, the invention relates to a preferential oxidation catalyst having a cerium oxide support on which is dispersed copper or an oxide thereof; and 0.2 wt. % or more of a platinum group metal. Preferably the cerium oxide support is in the form of a washcoat composition deposited on a monolith substrate, although other forms such as tablets and extrudates can be used.

In this copper-based, cerium-oxide supported catalyst, the platinum group metal is selected from the group consisting of platinum, palladium, rhodium, osmium, iridium, ruthenium and combinations thereof. Preferred preferential oxidation catalysts contain platinum.

A particularly preferred embodiment of this copper-based, cerium oxide-supported preferential oxidation catalyst has 5 to 14 wt. % of copper or an oxide thereof dispersed on the cerium oxide support; and 0.2 to 5 wt. % platinum dispersed on the cerium oxide support.

In a method aspect, the invention relates to a process for selectively oxidizing carbon monoxide from an input gas stream containing carbon monoxide, oxygen and hydrogen. The process includes the step of contacting the input gas stream with a preferential oxidation catalyst.

In some embodiments of the process there is at least 10% by volume of hydrogen in the input gas stream. The input gas stream composition can additionally include steam. In operation, the process is typically conducted using $O_2/CO$ ratio in the input gas stream of about 0.25 to 5 at a temperature of about 80 to 160° C.

In one embodiment, the preferential oxidation catalyst used in the process contains an oxide support on which is dispersed copper or an oxide thereof, a platinum group metal, and a reducible metal oxide. Preferred oxide supports, platinum group metals, reducible metal oxides, and preferred concentrations are as described above. The catalyst used in the process is preferably in the form of particles having a mesh size of 12 or greater, and a BET surface area of 10 m²/g or greater, having high mechanical strength.

In another embodiment, the process is conducted with the preferential oxidation catalyst containing a cerium oxide support, on which is dispersed copper or an oxide thereof and 0.2 wt. % or more of a platinum group metal. Preferred platinum group metals, and preferred concentrations therefor, are as described above for the copper-based, cerium oxide-supported catalyst. In preferred processes conducted with this catalyst, the catalyst composition is preferably in the form of a washcoat composition deposited on a monolith substrate.

In some embodiments of the process, an input gas stream is contacted with an article containing two preferential oxidation catalysts. In the process, the input gas stream is first contacted with an upstream catalyst to give a first outlet gas stream. Preferably, the first outlet gas stream contains less than 1000 ppm of carbon monoxide. The first outlet gas stream is then contacted with a downstream catalyst to give a second outlet gas stream. Preferably the second outlet gas stream contains less than 10 ppm of carbon monoxide.

The upstream catalyst of the article can be any preferential oxidation that provides carbon monoxide levels of less than 1000 ppm in the first outlet gas stream. In one embodiment, the downstream catalyst contains an oxide support (e.g., activated alumina) on which is dispersed copper or an oxide thereof, a platinum group metal (e.g., platinum), and a reducible metal oxide (e.g., cerium oxide). In another embodiment of the article, the downstream catalyst contains a cerium oxide support, on which is dispersed copper or an oxide thereof and 0.2 wt. % or more of a platinum group metal.

In another aspect, the invention relates to an apparatus for supplying hydrogen to a PEM fuel cell that incorporate the preferential oxidation catalysts of the invention. The apparatus has a hydrocarbon reformer reactor, a water-gas shift reactor, and a preferential oxidation reactor. The hydrocarbon reformer reactor is upstream and in train with the water-gas shift reactor, and the preferential oxidation catalyst is downstream and in train with the water-gas shift reactor.

In one embodiment of the apparatus, the preferential oxidation reactor contains the preferential oxidation catalysts with oxide supports on which are dispersed copper or an oxide thereof, a platinum group metal, and a reducible metal oxide. In another embodiment of the apparatus, the preferential oxidation reactor contains the preferential oxidation catalysts with a cerium oxide support, on which is dispersed copper or an oxide thereof and a platinum group metal.

DEFINITIONS

Figure 1:
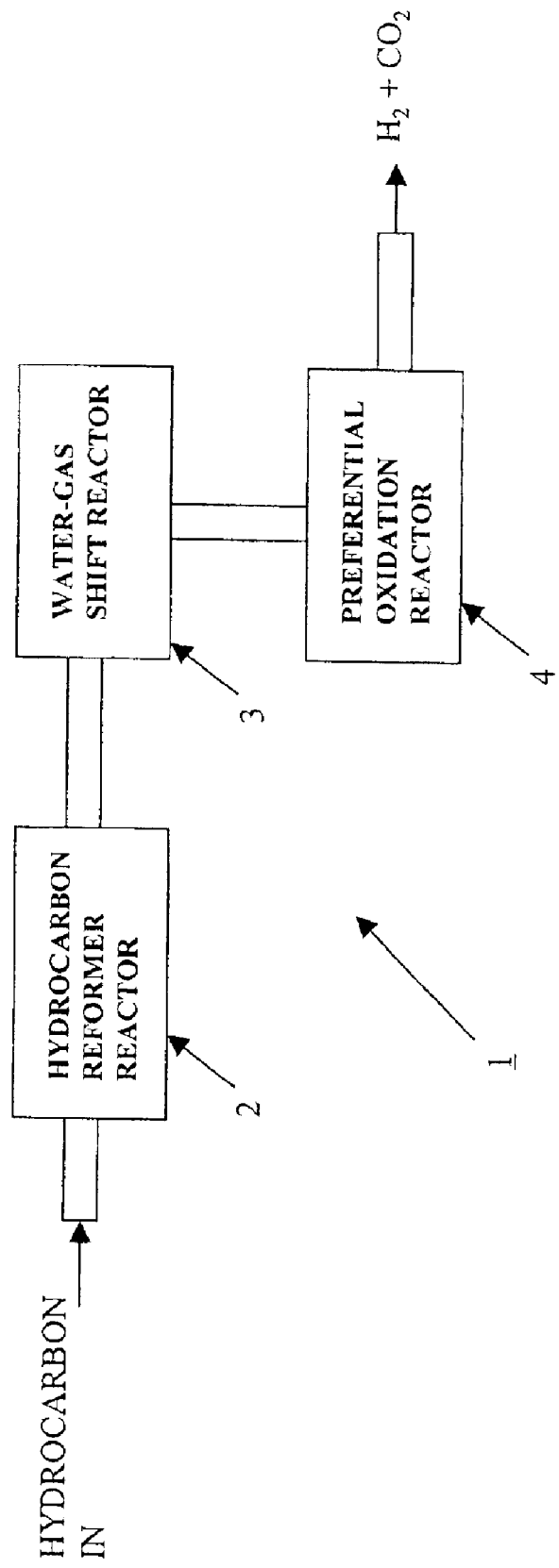
FIG. 1 is a depiction of one embodiment of fuel processor unit for supplying hydrogen to a fuel cell.

The definitions of certain terms used herein are as follows:

"activated alumina" means a high BET surface area alumina, for example greater than 10 $m^2/g$, preferably greater than 150 $m^2/g$ having primarily one or more of gamma, theta and delta aluminas.

"BET surface area" means the Brunauer, Emmett, Teller method for determining surface area by $N_2$ adsorption. Unless otherwise specifically stated, all references herein to the surface area refer to the BET surface area.

"Catalyst A" refers to a catalyst of the invention that includes a refractory inorganic oxide support (e.g., alumina), a copper catalytic agent, a reducible metal oxide (e.g., cerium oxide) and one or more platinum group metals.

"Catalyst B" refers to a catalyst of the invention that includes a cerium oxide support, a copper catalytic agent and one or more platinum group metals.

"catalytically effective amount" means that the amount of material present is sufficient to affect the rate of the carbon monoxide oxidation in the sample being treated.

"cerium oxide" includes all oxides of cerium including ceria ($CeO_2$). "cerium oxide support" refers to a particulate support material wherein cerium oxide is present, preferably in at least a concentration of 50 wt. % of the total catalyst weight. Other composite materials may be present along with the cerium oxide, including for example, other rare earth oxides (e.g., oxides of lanthanum, praseodymium, neodymium), zirconium oxide and gallium oxide.

"copper-based catalyst" refers to a catalyst that includes a copper catalytic agent. While a platinum group metal or oxide thereof may be included in the composition, its concentration is lower, preferably at least 5 times lower on a weight basis than the copper or oxide thereof.

"high heat capacity support" means support materials with a heat capacity that is approximately equal to or, preferably, greater than that of the reducible metal oxide in the catalyst.

"high surface area support" means support materials with a BET surface area that is approximately greater than 10 $m^2/g$, preferably greater than 150 $m^2/g$.

"incipient wetness impregnation" means the impregnation of the catalyst support with a volume of metal salt solution substantially equal to the pore volume of the support material.

"inlet temperature" shall mean the temperature of the hydrogen, water, and carbon monoxide stream, test gas, fluid sample or fluid stream being treated immediately prior to initial contact of the hydrogen stream, test gas, fluid sample or fluid stream with a catalyst composition.

"input gas stream" means a gas stream prior to passing through a catalytic region or prior to initial contact with a catalyst composition.

"in the presence of excess hydrogen" shall mean in the presence of at least 10% by volume hydrogen.

"percent by volume" refers to the amount of a particular gas component of a gas stream, unless otherwise indicated, means the mole percent of the gas component of the gas stream as expressed as a volume percent.

"wt. %." or "percent by weight", means weight percent based on the weight of an analyte as a percentage of the total catalyst weight, including the support and any material impregnated therein, including without limitation the copper catalytic agent and any metal oxide material impregnated therein. The calculation does not include the monolith substrate in embodiments where the catalyst is in the form of a washcoat composition deposited on a monolith substrate.

"selectivity" refers to the preferential oxidation of carbon monoxide in favor of hydrogen.

"supports" or "catalyst support" refer to particulate materials that are part of the catalyst composition used to maintain the surface area of the catalyst. Supports include oxide supports selected from the group consisting of activated alumina, zirconia, titania, silica, zeolites and combinations thereof for Catalyst A. Cerium oxide serves as an effective support for Catalyst B.

"VHSV" means volume hourly space velocity; that is, the flow of a reactant gas in liter per hour per liter of catalyst volume at standard temperature and pressure. In embodiments of the invention that include a monolith, the determination includes the total volume of monolith substrate.

"WHSV" means weight hourly space velocity; that is the flow of a reactant gas in liter per hour per kilogram of catalyst.

DETAILED DESCRIPTION OF THE INVENTION

In accordance with the invention, Applicants have found copper-based catalysts that selectively catalyze the oxidation of carbon monoxide in preference to the oxidation of hydrogen in a gas stream. During operation, the catalysts of the invention maintain their catalytic oxidation activity at lower temperatures, e.g., below 140° C., unlike conventional copper-based catalysts. The catalysts also achieve higher carbon monoxide conversions at lower temperatures than conventional copper-based catalysts, widening the effective temperature window where effective selective oxidation of carbon monoxide can be conducted. In addition, the activation temperatures of the catalysts of the invention are lower than conventional copper-based catalysts. The carbon monoxide content of hydrogen containing gas streams can be lowered, using the methods of the invention, to achieve levels below 100 ppm, and in some cases, below 10 ppm.

It has been found that the inclusion of low concentrations of platinum group metal to a copper-based catalyst composition stabilizes the composition toward exposure to temperature drops below about 140° C. The improved catalytic stability at lower temperatures allows the catalysts of the invention to operate at lower temperatures, where the selectivity for carbon monoxide oxidation over hydrogen oxidation is thermodynamically more favorable. The improved carbon monoxide selectivity at lower temperatures therefore allows achievement of lower levels of carbon monoxide in the output gas stream.

While the catalysts of the invention may be used in any application where it is desirable to remove carbon monoxide from a hydrogen gas stream, their incorporation into fuel processors that supply hydrogen to a fuel cell provides significant advantages. In addition to their ability to achieve minimal concentrations of carbon monoxide, the catalysts of the invention successfully operate as effective preferential oxidation catalysts under conditions typically utilized in fuel processors. In addition, the copper-based catalysts of the invention also remain active after temperature drops. This property is desirable for the transient operation of processors that would be used, for example, in residential or vehicular fuel cell applications, where power demands vary considerably.

While it will be apparent from the discussion regarding the platinum- and ruthenium-based catalysts above, that certain platinum group metals can serve as effective preferential oxidation catalytic agents themselves, their inclusion in the catalysts compositions is believed to serve primarily as a stabilizing species to the copper catalytic agents. The relatively low concentrations of the platinum group metal components in the catalysts of the invention as compared to the higher concentrations utilized in platinum metal-based preferential oxidation catalysts reflect this function. In addition, the utilization of a base metal, copper, in the catalysts of the invention offers significant cost advantages over platinum-based preferential oxidation catalysts. While higher concentrations can be used in the catalyst composition, lower concentrations of platinum group metals are preferred to reduce the potential for any reverse water-gas shift activity, which would limit the level to which carbon monoxide could be reduced in the output gas stream. In addition, lower levels of platinum group metals effectively stabilize the catalysts of the invention to exposure to low temperatures and temperature drops.

The catalysts of the invention include a catalyst support, copper or an oxide thereof, as a catalytic agent, and one or more platinum group metals. The catalyst can be in any form, including tablets, extrudates, washcoat compositions deposited on monolith substrates and high-strength, high heat capacity particulate catalysts.

In one embodiment, the invention relates to a preferential oxidation catalyst that includes a refractory inorganic oxide support (e.g., alumina), a copper catalytic agent, a reducible metal oxide (e.g., cerium oxide) and one or more platinum group metals. For economy of expression this catalyst will be referred to herein as "Catalyst A".

In a second embodiment, the invention relates to a preferential oxidation catalyst that has a cerium oxide support, a copper catalytic agent and one or more platinum group metals. Here again, for reasons of convenience, this catalyst will be referred to herein as "Catalyst B".

Catalyst A

Catalyst A contains a refractory inorganic oxide support (e.g., alumina). Dispersed on the support are a copper catalytic agent, a reducible metal oxide (e.g., cerium oxide) and one or more platinum group metals. The catalyst can be in any form including extrudates, tablets, washcoat compositions deposited on monolith substrates and high mechanical strength, high heat capacity, particulate catalysts. Preferred forms of the catalyst are as high strength, high-heat capacity particulate catalysts.

Typically, there is at least 5 wt. % of copper in the catalyst composition for Catalyst A, to serve as a catalytic agent. Preferably, there is at least 5 to 14 wt. % of copper in the catalyst composition. The copper catalytic agent can be in the form of copper (II) oxide (CuO), copper (I) oxide ($Cu_2O$) or as metallic copper depending on the conditions that the catalyst is exposed to. The copper is generally dispersed on the inorganic oxide support by contacting the support with a water-soluble or water-dispersible salt of copper for sufficient time to impregnate the support, followed by a drying step. The support material containing the copper is then calcined, preferably at a temperature above about 400° C.

The catalysts of the invention include a platinum group metal as a stabilizing species, which is selected from the group consisting of platinum, palladium, rhodium, iridium and ruthenium. Preferably, the platinum group metal is platinum, palladium or rhodium, with platinum being particularly preferred. The platinum group metals are typically dispersed on the support by contacting the support with a water-soluble or water-dispersible salt of the platinum group metal for sufficient time to impregnate the support. Non-limiting examples of such platinum group metal salts include nitrates, acetates, alkali-free amine-solubilized platinum hydroxide, palladium and rhodium nitrate. The supported platinum group metal is then calcined to fix it to the support as the metal or as an oxide. Preferably, the amount of the platinum group metal salts is chosen so that the final concentration of the platinum group metal on the support is about 0.01 to about 0.5 wt. %, more preferably 0.05 wt. % to about 0.25 wt. %.

Suitable reducible metal oxides for Catalyst A include the oxides of chromium, vanadium, molybdenum, cerium, praseodymium, neodymium, titanium, nickel, manganese, cobalt, as well as combinations thereof. Typically, there is at least 10 wt. % of the reducible metal oxide in the catalyst composition, with levels of 10 to 25 wt. % being preferred.

A preferred reducible metal oxide is cerium oxide. While cerium oxide alone serves as the reducible metal oxide component, in some applications it is desired to include certain composite materials of cerium oxide. These cerium oxide composites additionally contain other rare earth metal oxides component such as oxides of lanthanum, praseodymium, and neodymium. In addition to these rare earth metal oxide composites, other composite materials such as zirconia-cerium oxide, gallium oxide-cerium oxide, titania-cerium oxide are also useful as a reducible metal oxide components in Catalyst A. In both types of composite materials, it is believed that the additional component acts as a stabilizer for the cerium oxide component, although in some cases, the additional component may also serve to promote the selective oxidation reaction. In composites comprising cerium oxide with the additional components, the additional component may comprise up to about 30 wt. % of the reducible metal oxide component of the composition.

Inorganic oxide supports for Catalyst A include high surface area, refractory oxide supports. These refractory oxide supports include, for example, activated alumina, zirconia, titania, silica, and zeolites. These supports also include combinations of these inorganic oxides such as stabilized forms of alumina including composites of zirconia, or silica with alumina, for example, alumina-zirconia, silica-alumina, and alumino-silicates.

In preferred embodiments of Catalyst A, the support is substantially comprised of alumina which preferably includes the members of the gamma or activated alumina family, such as gamma and eta aluminas, and, if present, a minor amount of other refractory oxides, e.g., up to about 20 wt. % of silica, zirconia, and titania. Preferably, the activated alumina has a specific surface area of at least 10 m$^2$/g. More preferably, the activated alumina has a specific surface area of at least 150 m$^2$/g.

In other preferred embodiments of Catalyst A, the catalyst supports possess high heat capacity and high mechanical strength. Copper-based water catalysts are prone to extremely rapid temperature rises due to the rapid and exothermic oxidation of carbon monoxide and hydrogen. Such rapid temperature rises can result in a reduced selectivity for carbon monoxide oxidation. The reduced selectivity at higher temperatures in turn results in lower levels of hydrogen in the output stream. In industrial settings, reactors are equipped with sophisticated process controls and protocols that can control the temperature rise that occurs upon oxidation. In fuel cell processors in residential or vehicular applications, however, such controls and protocols are impractical to implement. The incorporation into fuel processors of copper-based preferential oxidation catalysts less prone to these temperature rises is therefore desirable.

The high mechanical strength of these preferred supports yields a system that is resistant to attrition that may occur due to vibration and other wear mechanisms.

The high heat capacity, high mechanical strength catalysts in this embodiment comprise a structurally strong support of any suitable durable high heat capacity material, such as alumina, which is in a particulate form preferably having a longest dimension of about 1/32-inch (0.78 mm) to about 1/2 inch (1.25 cm) in cross section. Preferably, the support particle is at least 1/16-inch (1.56 mm) in cross section or, in other terms, has a mesh size of 12 (sieve opening of 1.52 mm) or above. For example, the support particle preferably has a mesh size of 12, 11, 10, etc. The catalytic supports in this embodiment are impregnated, with a suitable precursor of a reducible metal oxide, the copper catalytic agent and one or more platinum group metals. Preferred support materials have a heat capacity that is preferably higher than that of the reducible metal oxide. Examples of supports are silica, zeolites, zirconia, titania and alumina. Activated alumina is a particularly preferred support.

The high heat capacity particulate support in this preferred embodiment can take the form of any suitable high strength support such as a particle, pellet, extrudate, tablet and the like. The support is preferably in a durable, rigid form. A number of supports that are suitable for preparing the catalysts of the invention and practicing the methods of the invention are readily commercially available. For example, 1/8-inch diameter alumina particles available from ALCOA as DD-443 (with 327 m$^2$/g BET surface area measured as received) can be used to practice the invention. Desirable characteristics for preferred supports include: having a high mechanical strength (resistance to crumbling), being readily available; having the capacity for being impregnated to high loadings with copper catalytic agents, reducible metal oxides and other catalyst additives; and possessing a high heat capacity. Supports with a heat capacity of at least the heat capacity of the reducible metal oxide are preferred. Supports with a heat capacity greater than the heat capacity of the reducible metal oxide are particularly preferred.

Due to their low pyrophoricity, high strength particulate catalysts having a high heat capacity supports are preferred forms of Catalyst A. These catalysts can be prepared by first impregnating the particulate support with the reducible metal oxide precursor, followed by drying and calcination. For example, in a preferred preparation calcined 1/8-inch alumina support particles are impregnated in an aqueous solution of cerium nitrate (or any other suitable $CeO_2$ precursor such as cerium acetate, chloride, etc.). The particles are then dried and calcined at 500° C. in air to prepare the cerium oxide-impregnated alumina support (or "$CeO_2$/alumina particles").

After preparation of the particulate support with the reducible metal oxide, the support can be impregnated with a precursor of the copper catalytic agent. The $CeO_2$/alumina particles are impregnated with an aqueous solution of a water-soluble copper salt, e.g., copper (II) nitrate, at a weakly acidic pH. The particles are then dried and calcined to provide $CuO/CeO_2$/alumina particles. Finally, the $CuO/CeO_2$/alumina particles are similarly impregnated with a desired concentration of a water-soluble salt of the platinum group metal [e.g., alkali-free amine-solubilized platinum hydroxide] followed by a calcination step to provide the $CuO/CeO_2$/alumina particles impregnated with platinum.

In other embodiments of Catalyst A, wherein the catalyst is in the form of washcoat compositions, extrudates and tablets, the catalyst is preferably formed from powdered supports impregnated with the copper catalytic agent, the platinum group metal and reducible metal oxide.

The impregnated, powdered supports can be prepared by incipient wetness impregnation of the oxide support (e.g., activated alumina) with soluble salts of the reducible metal (e.g., cerium). For example, soluble salt forms of the reducible metal such as acetates, halides, nitrates, sulfates and the like can be utilized. This step is followed by drying and calcination steps to fix the reducible metal component as its oxide to the refractory oxide support.

The calcined support is then impregnated in analogous fashion with a desired concentration of a water-soluble salt of the copper (e.g., copper (II) nitrate) followed by drying and calcination steps. Finally, the resulting oxide support is impregnated with a desired concentration of a water-soluble salt of the platinum group metal (e.g., platinum nitrate) followed by a calcination step. The calcined, impregnated powdered oxide support containing the copper catalytic agent, the platinum group metal, and reducible metal oxide can then be formed into either an extruclate, tablet, or washcoat composition for deposition on a monolith substrate.

In embodiments of the invention wherein the catalyst is in the form of extrudates, the calcined, powdered oxide support containing the copper catalytic agent, the platinum group metal, and reducible metal oxide is typically mixed with a binder and extruded through a die of the desired shape.

Typical useful binders include hydrated forms of alumina (e.g., pseudoboehmite), silica binders, clay binders, zirconia binders and the like.

Tablets can be prepared by: (1) combining the calcined, powdered oxide support with a binder; (2) shaping the combined powder and binder into the desired shape which could include tablets, pellets, beads, cylinders or hollow cylinders; and (3) calcining the shaped catalyst.

Washcoat compositions of the catalyst for deposition on monolith substrates (or "slurries") are prepared using methods known in the art. Preferably, the impregnated oxide support is ball milled as a suspension using sufficient water to prepare a slurry of a desired concentration. The concentration of the solids in the washcoat slurry can be used as a method to control the thickness of the catalyst coating ultimately deposited on the monolith substrate. For example, increasing the weight percentage of solids in the aqueous slurry will result in a thicker catalytic coat.

It is also generally advantageous to prepare slurries having particles of small particle sizes, e.g., less than 10 $\mu$m, to maximize the surface area of the catalyst upon deposition on the monolith substrate. Therefore, the particle size distribution of the slurry is typically measured, and milling is continued until the desired particle size has been achieved. Here again, binders are optionally included in the slurries to improve adherence of the washcoat to the monolith substrate walls.

The washcoat slurries are deposited on the monolith substrate by methods well-known to those of ordinary skill. Thus, for example, a layer of the supported copper catalyst can be prepared by dipping the substrate in a reservoir containing a sufficient volume of the slurry so that the substrate is fully immersed. The coated substrate can be subsequently dried and calcined.

As mentioned above, the washcoat catalyst compositions of the invention are disposed on monolith substrates to form coated monolith substrates. Although a variety of monolith substrates could be used, the monolith substrate is preferably of the type with one or more monolithic bodies having a plurality of finely divided gas flow passages (channels) extending therethrough. Preferably, the monolith substrate is of the type having a plurality of fine, parallel gas flow passages extending across the longitudinal axis of the substrate from an inlet or an outlet face, so that the channels are open to fluid flow therethrough (often referred to as a "honeycomb substrate"). The passages, which are essentially straight from the inlet and outlet of the substrates, are defined by walls on which the catalyst composition can be coated in washcoat compositions so that the gases flowing through the passages contact the catalyst material.

Monolith substrates are commercially available in various sizes and configurations. The flow passages of the monolithic substrate are thin-walled channels which can be of any suitable cross-sectional shape and size such as trapezoidal, rectangular, square, sinusoidal, hexagonal, oval, circular. Such monolithic substrates may contain up to about 700 or more flow channels ("cells") per square inch of cross section, although far fewer may be used. For example, the substrate can have from about 60 to 600, more usually from about 200 to 400, cells per square inch ("cpsi").

Various types of materials of construction for monolith substrates are known. The monolith substrate can be made from a variety of materials, including metal or ceramic monoliths. In some embodiments, the monolith substrate can be made from a ceramic porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and like. Some non-limiting examples of ceramic monoliths can include those made of: zirconium, barium titanate, porcelain, thorium oxide, magnesium oxide, steatite, boron or silicon carbonates, cordierite-alpha alumina, silicon nitride, spodumene, alumina-silica magnesia, zircon silicate, sillimanite, magnesium silicates, zircon, petalite, alpha alumina and aluminosilicates. One example of a commercially available material for use as the substrate for the present invention is cordierite, which is an alumina-magnesia-silica material.

The metallic monolith substrate can be a honeycomb substrate made of a refractory metal such as a stainless steel or other suitable iron-based corrosion resistant alloys (e.g., iron-chromium alloy). Metal monoliths can be produced, for example, from alloys of chromium, aluminum and cobalt, such as those marketed under the trademark KANTHAL, or those produced from alloys of iron, chromium, aluminum and yttrium, marketed under the trademark of FECRALLOY. The metal can also be carbon steel or simple cast iron. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which can range, typically, from about 200 to about 1,200 per square inch of face area. Heat exchangers, which are typically formed from metallic materials, can also be used as the monolith structures.

In other embodiments, the monolith substrate can be made of a ceramic or metal foam. Monolith substrates in the form of foams are well known in the prior art, e.g., see U.S. Pat. No. 3,111,396 and SAE Technical Paper 971032, entitled "A New Catalyst Support Structure For Automotive Catalytic Converters" (February, 1997).

Catalyst B

Catalyst B contains a copper catalytic agent and one or more platinum group metals dispersed on a cerium oxide support The catalyst can be formed as extrudates, tablets and washcoat compositions deposited on monolith substrates. Preferred forms of Catalyst B are as washcoat compositions deposited on monolith substrates.

Typically, there is at least 5 wt. % of copper in the Catalyst B composition. Preferably, there is about 5 to 14 wt. % of copper in Catalyst B. The copper is preferably dispersed on the inorganic oxide support by contacting the cerium oxide support with a water-soluble or water-dispersible salt of copper for sufficient time to impregnate the cerium oxide, followed by a drying step. The support material containing the copper can then be calcined, preferably at a temperature above about 400° C.

Catalyst B of the invention includes a platinum group metal, which is selected from the group consisting of platinum, palladium, rhodium, iridium and ruthenium. Preferably, the platinum group metal is platinum, palladium or rhodium, with platinum being particularly preferred. Analogous to the methods for preparation of Catalyst A, the platinum group metals are typically dispersed on the cerium oxide support by impregnation followed by calcination. Preferably, the amount of the platinum group metal salts is chosen so that the final concentration of the platinum group metal on the support is about 0.2 wt. % to about 5 wt. %, although lower concentrations of platinum group metals, e.g., 0.2 to 1 wt. %, are more preferred for reduced material costs.

Cerium oxide serves as the support of Catalyst B. While cerium oxide alone can be used for the support, in certain applications it may be desirable to include additives to the cerium oxide that stabilize the support. For example, certain composite materials of cerium oxide that additionally contain other rare earth metal oxides component such as oxides of lanthanum, praseodymium, and neodymium are useful. In addition to these rare earth metal oxide composites, certain composite materials such as zirconia-cerium oxide, gallium oxide-cerium oxide, titania-cerium oxide are also useful as composite cerium-oxide support materials for Catalyst B. In both types of composite materials, it is believed that the additional component acts as a stabilizer for the cerium oxide support, although in some cases, the additional component may also serve to promote the carbon monoxide oxidation. With composite support materials comprising cerium oxide with additional stabilizing component, typically the stabilizing component may comprise up to about 30 wt. %, but preferably less than 25 wt. % of the cerium oxide support of the composition.

Washcoat compositions, extrudates and tablets of Catalyst B are preferably formed from powdered cerium oxide impregnated with the copper catalytic agent and platinum group metal.

In a preferred embodiment, Catalyst B is prepared by impregnating cerium oxide powder with a solution of a water-soluble salt of copper, e.g., copper (II) nitrate, followed by drying at, for example 120° C., and calcination at, for example, 500° C. Preferably, the impregnation is accomplished using incipient wetness impregnation wherein minimal volumes of copper salt solutions are employed to soak the cerium oxide support. The resulting cerium oxide support is then impregnated with a water-soluble salt of a platinum group metal, e.g., platinum nitrate. A drying and a calcination step follow to provide powdered Catalyst B. The powdered Catalyst B composition can be formed into extrudates, tablets and washcoat compositions using the methods described above for forming the Catalyst A compositions.

As an alternative to the impregnation method described above, catalyst B can also be prepared utilizing an aqueous solution containing a mixture of a water-soluble cerium salt, e.g., cerium nitrate, and a water-soluble copper salt, e.g., copper (II) nitrate. The pH of the solution is then raised by addition of a base, e.g., sodium carbonate, to the solution to precipitate a material comprising a mixture of the corresponding hydroxides of copper and cerium. Preferably the solution is stirred during the precipitation step. The resulting coprecipitate is collected, dried and calcined to provide mixed metal oxide material comprising copper oxide and cerium oxide. Impregnation of the mixed metal oxide material with a platinum group salt followed by a calcining of the material can be used to incorporate the platinum group metal component into the Catalyst B composition.

The invention also relates to processes for using the catalysts of the invention, i.e., Catalysts A and B. In a preferred embodiment, the catalysts of the invention are used as preferential oxidation catalysts in processes for the selective oxidation of carbon monoxide in a hydrogen gas stream. For example, the catalysts of the invention can be incorporated in a reactor that is charged with an input gas stream containing hydrogen and carbon monoxide to produce an output hydrogen stream that contains substantially lower levels of carbon monoxide. For example, levels below 10 ppm in the output hydrogen gas stream can be achieved using the selective oxidation processes of the invention.

The preferential oxidation catalysts of the invention are reduced (activated) prior to their use in the selective oxidation reaction. For operational simplicity and decreased startup time, it is preferred that the process gas itself, containing carbon monoxide and hydrogen, serve as the reducing gas stream for the catalysts of the invention.

The composition of the input gas stream for the process can vary depending on the source of the hydrogen gas stream. For instance, in fuel cell applications the input gas stream for the process could include carbon dioxide, steam, and nitrogen in addition to hydrogen and carbon monoxide. Minor amounts of hydrocarbon may also be present.

The selective oxidation processes of the invention can accommodate a range of carbon monoxide concentrations in the input hydrogen stream, depending on the output CO concentration requirements of a particular application. In fuel cell applications the concentration of CO in the input hydrogen stream is generally from 0.05 to 3% by volume.

Higher levels of carbon monoxide in the input hydrogen gas stream can be accommodated by variation of other parameters. Although less desirable from the standpoint of hydrogen fuel conservation, a higher carbon monoxide conversion can be achieved at the expense of consuming hydrogen, by increasing the inlet temperature or increasing the $O_2/CO$ ratio.

More preferably, one of ordinary skill in the art will recognize that the process of the invention can conducted by staging into two or more catalyst beds. In this arrangement, the input gas stream containing hydrogen and a level of carbon monoxide would contact the first catalyst bed to produce an intermediate gas stream that would contain a reduced level of carbon monoxide. The intermediate gas stream would then contact a second catalyst bed to produce an outlet gas stream containing still lower levels of carbon monoxide. Additional catalyst stages could be provided until the desired carbon monoxide threshold is achieved. Multi-bed embodiments of the process are described in the Examples section.

In fuel cell applications of the inventive process, the input gas streams typically contain at least 10% by volume of hydrogen, and more typically from about 40 to 70% on a dry basis in addition to the carbon monoxide. In addition, there is typically from about 10 to about 30% by volume added steam (i.e., gaseous $H_2O$) in the input hydrogen gas streams in fuel processors. These levels of steam in the input gas stream can be accommodated by the process of the invention.

The molar ratio of oxygen to carbon monoxide in the input gas stream ($O_2/CO$ ratio) to the process can be adjusted to optimize carbon monoxide conversion and the selectivity of the oxidation reaction. For example, one of skill in the art will recognize that higher $O_2/CO$ ratios favor higher carbon monoxide conversions. Lower $O_2/CO$ ratios, however, favor more selective oxidation of carbon monoxide instead of hydrogen. This parameter can be adjusted according to the particular requirements of the application. In fuel cell applications, the $O_2/CO$ ratio is preferably from 0.25 to 5, and more preferably from about 0.5 to 3.

The reaction temperature of the inventive, selective oxidation process can be adjusted to optimize the reaction rate, carbon monoxide conversion and selectivity. For instance, lower reaction temperatures favor increased selectivity for carbon monoxide oxidation for a gas compositions at the same space velocity and $O_2/CO$ ratio. Higher temperatures, however, are useful for achieving adequate carbon monoxide conversion for input hydrogen streams at higher space velocities. In fuel cell applications, preferred operating temperatures for the process of the invention are from about 80 to 160° C., with a more preferred range of from about 80 to 130° C.

Reaction zone pressure is preferably maintained below the dew point pressure of the reaction mixture. It should be recognized that lower or higher reaction zone pressures can be used such as from atmospheric up to about 500 psig.

Preferably, the selective oxidation process is carried out in a continuous mode with the reactants being passed over the catalyst contained in one or more reaction zones. Gaseous hourly space velocities of about 500 to about 50,000 $hr^{-1}$ VHSV measured on the basis of dry gas under standard conditions are particularly suitable for most fuel cell operations. In embodiments wherein the catalysts are in the form of washcoat compositions deposited on monolith substrates, space velocities of up to 100,000 $hr^{-1}$ VHSV can be accommodated. Preferred operating ranges wherein the catalyst compositions are deposited on a monolith substrate are 5 to 30,000 $hr^{-1}$. One skilled in the art would recognize that lower gas reactant flow rates favor more complete carbon monoxide conversion.

Although the preferential oxidation catalysts of the invention can be used in any application where it is desired to remove carbon monoxide from a hydrogen-containing gas stream, a particularly useful application is in apparatus such as fuel processors that supply hydrogen to fuel cells. These processors typically comprise a series of reactors that convert hydrocarbon fuels (e.g., natural gas, gasoline, fuel oil, liquid petroleum gas, and the like) into hydrogen fuel. The conversions that take place in the reactors typically include reforming reactions and water-gas shift reactions to produce hydrogen. Other reactors and trapping devices can also be included in the apparatus that reduce unwanted components in the hydrogen feed streams (e.g., sulfur components), that are ultimately supplied to the fuel cell. Preferential oxidation reactors, where the selective oxidation of carbon monoxide is conducted, is typically performed as a finishing step to polish the hydrogen feed stream of residual carbon monoxide.

As seen in a typical fuel processor (1) depicted in FIG. 1, the hydrocarbon reformer reactor (2) converts hydrocarbons (e.g., methane) and steam into hydrogen, carbon monoxide, and carbon dioxide. For example, the hydrocarbon, methane is converted by the two reactions below:

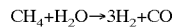

$CH_4 + H_2O \rightarrow 3H_2 + CO$

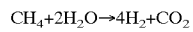

$CH_4 + 2H_2O \rightarrow 4H_2 + CO_2$

The resulting gas is then reacted in the water-gas shift reactor (3) to enrich the process gas further in hydrogen, through the reaction of carbon monoxide with steam. Residual carbon monoxide in the process stream is then removed by selective oxidation of carbon monoxide in the preferential oxidation reactor (4). The resulting process stream comprising high levels of hydrogen is then supplied to the fuel cell.

The following examples further illustrate the present invention, but of course, should not be construed as in any way limiting its scope. The concentration of specific components of gas compositions, other than steam, are expressed either as volume percentages or as parts per million (ppm) on a dry basis. The concentration steam is indicated as a percentage of added steam. The flow rate of the test gases were adjusted to achieve the specified space velocities. The concentration of CO in the output gas was detected in the examples using an infrared gas analyzer (Siemens Applied Automation) and the $O_2$ was detected using an electrochemical analyzer (Advanced Instruments).

EXAMPLE 1

Preparation of a Copper Ceria-supported Preferential Oxidation Catalyst Impregnated with 0.5 wt. % Pt. (Exemplifies Preparation of Catalyst B Deposited on a Monolith Substrate, Catalyst B1, B2 and C)

205 g of cerium oxide powder (HSA-15 cerium oxide available from Rhodia, Inc.) was impregnated with 80.6 g of copper nitrate solution in water using the incipient wetness method. The powder was calcined using a two-step process; holding the temperature at 120° C. for 2 hours, and then at 500° C. for 2 hours. The powder was cooled to yield an intermediate powder of 215 g cerium oxide impregnated with 8 wt. % copper oxide (CuO). This composition was used to prepare Catalyst C.

The intermediate powder was then impregnated with an aqueous solution of alkali-free amine-solubilized platinum hydroxide containing 1.08 g of platinum. After 1 hour, acetic acid was added to immobilize the platinum on the cerium oxide support. The resulting material was calcined using the two step procedure described above to yield cerium oxide support impregnated with 8 wt. % copper oxide and 0.5 wt. % platinum. This composition is used to prepare Catalyst B1.

A second portion of the intermediate cerium oxide powder (281 g) impregnated with 8 wt. % copper oxide was prepared as described above. This portion was impregnated with an aqueous solution that contained 0.70 g of platinum in the amine-solubilized platinum hydroxide salt solution, treated with acetic acid (15.15 g), and calcined using the two step calcination procedure to provide cerium oxide powder impregnated with 8 wt. % copper oxide and 0.25 wt. % platinum. This composition is used to prepare Catalyst B2.

3 in ×0.75 in 400 cpsi cordierite monolith pieces were coated with the two slurries, dried and calcined; a dry gain of ~2 $g/in^3$ was achieved.

The monolith substrate coated with the catalyst composition containing 0.5 wt. % Pt is Catalyst B1.

The monolith substrate coated with the catalyst composition containing 0.25 wt. % Pt is Catalyst B2.

The monolith substrate coated with the catalyst composition without any platinum metal is Catalyst C.

EXAMPLE 2

Determination of CO Conversion Using Catalyst B1 (Single Bed)

Catalyst B1 of Example 1 was tested for its carbon monoxide conversion and selectivity when exposed to a test gas composition that modeled a reformate gas stream. The test gas had a dry gas composition of 0.3% CO, 15% $CO_2$, 50% $H_2$ and the balance was $N_2$. 25% steam was added as a diluent. Air was added as a source of oxygen. The catalyst was placed in a quartz tube reactor, exposed to the test gas, and oxidation began at the minimum temperature measured, 90° C. The space velocity of the test gas composition was 15 k/hr. The inlet temperature and the $O_2$/CO ratio was adjusted to yield a product gas stable with respect to CO concentration. The catalyst reached at an inlet temperature of 140° C. and an $O_2$/CO ratio of 1.5. The product gas contained 550 ppm of CO, which is equivalent to a CO conversion of 82%. 27% of the added $O_2$ reacted with the CO.

EXAMPLE 3

Determination of CO Conversion from an Input Gas Stream Containing 1.5% CO Using the Catalyst of Catalyst B1 (Two Sequential Beds)

Two sections of the B1 catalyst of Example 1 were arrayed in series with respect to the input gas stream. The temperature of the first bed was 125° C., while the temperature of the second catalyst bed was 128° C. The test gas composition in this example contained 1.5% CO, 15% $CO_2$, 50% $H_2$ and the balance was $N_2$. 25% steam was added as a diluent. Air was added as a source of oxygen. The monolith space velocity of the gas stream was 15 k/hr over the first catalyst bed and 30 k/hr over the second catalyst bed. The $O_2$/CO ratio of the initial gas stream was 0.75. After contact with the first catalyst bed, the CO concentration in the intermediate gas stream was 5440 ppm. Air was injected into the intermediate gas stream before contact with the second catalyst bed to increase the oxygen concentration to 0.39%. After contact with the second catalyst bed, the CO concentration in the outlet gas stream was 683 ppm. For the two catalyst stages, the overall amount of molecular oxygen added was about equimolar to the initial CO concentration. This outlet CO concentration represented an 95% reduction in the initial CO concentration across the two catalyst stages.

EXAMPLE 4

Catalyst B1 Performance as Polishing Bed

Whereas Examples 2 and 3 serve to demonstrate the applicability of the Cu/Ce/Pt catalyst (Catalyst B) for the preferential oxidation of carbon monoxide, a preferred aspect of the invention is a reliable low-temperature catalyst for achieving<10 ppm of CO in the presence of levels of both hydrogen and carbon monoxide found in fuel cell processors. This experiment was designed to simulate the conditions that a single catalyst bed would be exposed to as a last bed (also referred to as a "polishing bed") in a multi-bed system. Experiments were conducted to determine conditions necessary to achieve a final CO concentration in the output gas of ~10 ppm over a wide range of flow conditions. For the purposes of uniformity, the inlet gas concentration of CO was kept at 500 ppm. The test gas composition also contained 15% $CO_2$, 50% $H_2$ and the balance was $N_2$. 25% steam was added as a diluent. Air was added as a source of oxygen. Table 1 summarizes the effects of temperature, space velocity and $O_2$/CO Ratio on the Catalyst B1 performance as measured by CO detected in the outlet gas stream.

TABLE 1

| Monolith VHSV | Inlet Temperature | $O_2$/CO ratio | outlet [CO] (ppm) |
|---|---|---|---|
| 10 k/hr | 115 | 4:1 | 2.5 |
| 10 k/hr | 120 | 4:1 | 5.5 |
| 25 k/hr | 120 | 8:1 | 5 |
| 25 k/hr | 120 | 7.5:1 | 14 |
| 25 k/hr | 125 | 8:1 | 2.5 |
| 25 k/hr | 125 | 5.2:1 | 4.9 |
| 25 k/hr | 125 | 4.5:1 | 9.0 |
| 50 k/hr | 125 | 5:1 | 10 |
| (550 ppm)* | 130 | 5:1 | 14 |
|  | 130 | 5.2:1 | 12 |
|  | 120 | 5.2:1 | 15 |
|  | 125 | 5.4:1 | 9 |

*For technical reasons the CO concentration in the input gas stream was increased at a space velocity of 50 k/hr.

The data shows that the catalyst performs optimally at low temperature (115° C.) at low space velocity because of the improved selectivity. As space velocity (~25 k/hr) is increased, a higher temperature is preferred. As a result of higher operating temperatures, a higher $O_2$/CO ratio is required to compensate for operating in a regime with lower selectivity for CO oxidation.

EXAMPLE 5

Determining the Reverse Water-Gas Shift Liability for Catalyst

Figure 2:
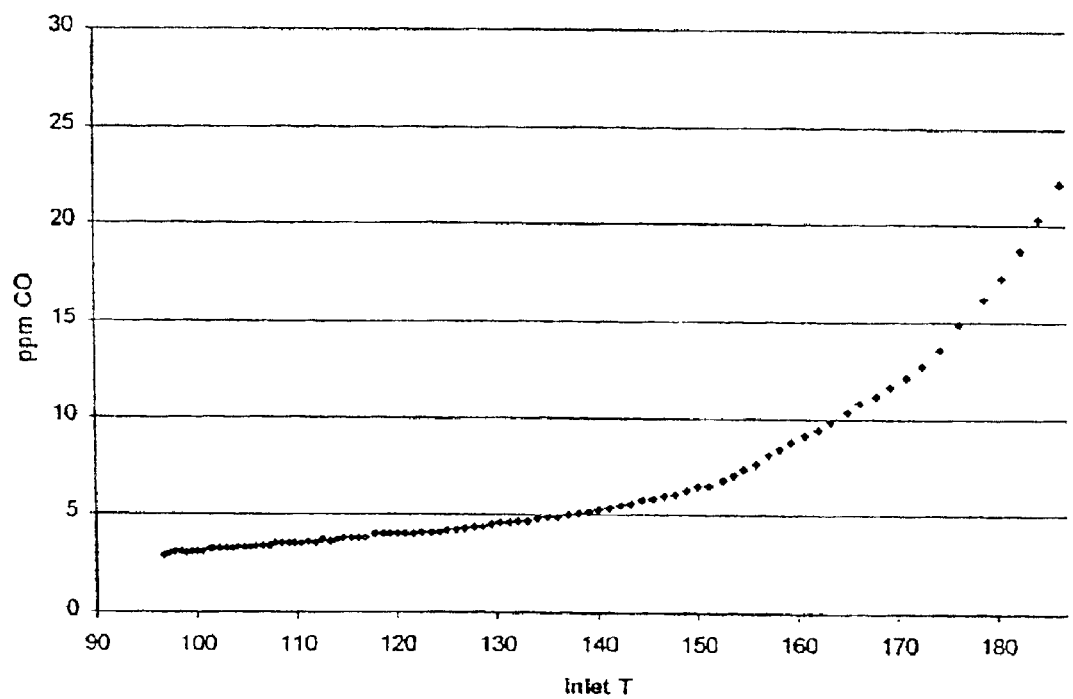
FIG. 2 is a graphic representation of test results for the reverse water-gas shift properties of an embodiment of Catalyst B.

The extent of the catalytic activity for the reverse water-gas shift was determined using the monolith Catalyst B1 of Example 1. The monolith catalyst was placed in a quartz reactor tube and heated to 200° C. The catalyst was cooled with a test gas stream containing 50% $H_2$, 15% $CO_2$, and the balance $N_2$ at a space velocity of 17 k/hr. 25% steam was added a diluent. No CO or oxygen was added to the test gas stream. Any CO formed was measured in the outlet gas. The data is graphically presented in FIG. 2. As is shown in FIG. 2, the catalyst exhibits minimal reverse water-gas shift activity at temperature ranges useful for the preferential oxidation of CO in hydrogen feed streams. For example at 140° C., only 5 ppm of CO was detected in the output gas stream.

EXAMPLE 6

Comparative Example for Operating Ranges with Conventional Copper-containing Preferential Oxidation Catalyst (Catalyst C)

Figure 3:
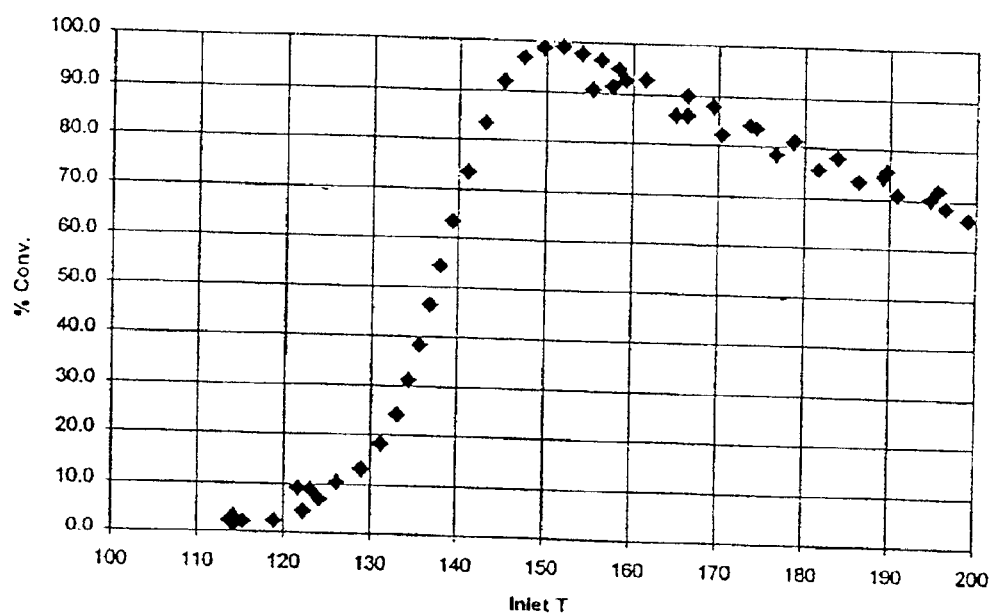
FIG. 3 is a graphic representation of test results obtained for the carbon monoxide conversion percentage with temperature for a conventional copper-based catalyst.

Using the Catalyst C, containing copper oxide (8 wt. % CuO) on a support of cerium oxide (without any platinum group metal in the composition, prepared in Example 1), the "$T_{50}$" or temperature at which the CO conversion achieves 50% of the total input CO was determined. The $T_{50}$ was determined using a test gas stream containing 0.6% CO, 15% $CO_2$, 50% $H_2$, and the balance was $N_2$. Steam (25%) was added as a diluent. The determination of the $T_{50}$ was conducted using an inlet temperature range of 110–200° C. The results of the determination are graphically represented in FIG. 3. As can be seen in FIG. 3, the $T_{50}$ is in excess of 130° C. By comparison, the $T_{90}$ observed for Catalyst B1, containing 0.5 wt. % of platinum, was 90° C. The relatively high activation temperature for the conventional copper-based Catalyst C requires is less desirable, due to the increased startup time required for catalyst activation.

The catalyst performance of the Catalyst C as a function of $O_2$/CO ratio and temperature was also determined using a test gas composition of 0.5% CO, 15% $CO_2$, 50% $H_2$, and the balance was nitrogen. Steam (25%) was added as a diluent. The optimal operating temperature was around 150° C. At this temperature, at an $O_2$/CO ratio of 1, about 95% of the CO was oxidized. The catalytic activity, however, dropped to almost nil if the temperature decreased below 135° C. It is believed that the deactivation is due to the re-oxidation of the catalyst. The CO oxidation activity would only return if the catalyst was reheated in the test gas composition to effect reduction. The example highlights the narrow temperature window of this conventional copper-based catalyst relative to the catalysts of the invention.

EXAMPLE 7

Comparative Example for Operating Ranges with an Iron-promoted Platinum on Alumina Catalyst- preferential Oxidation Catalysts For comparative purposes, the catalyst performance of an platinum-based, iron promoted monolith catalyst (containing a washcoat with 5 wt. % platinum and 0.3 wt. % iron on alumina as disclosed in WO 01/17681) as a function of $O_2$/CO ratio and temperature was also determined using a test gas composition of 0.3% CO, 15% $CO_2$, 50% $H_2$, and the balance was nitrogen. Steam (25%) was added as a diluent. At a space velocity of 30 k/hr, an inlet temperature of 90–95° C. and an $O_2$/CO ratio of 1.4, a CO concentration of 8 ppm was achieved in the output gas stream.

When the space velocity of the test gas stream was reduced, however, it is difficult to achieve a CO concentration of <10 ppm in the outlet gas stream because of reverse water-gas shift activity, e.g., when the catalyst was tested with the same test gas composition at a space velocity of 6 k/hr. When the concentration of CO in the test gas stream was decreased to 750 ppm, the variation of the $O_2/CO$ ratio from values ranging from 2:1 to 3.8:1 had minimal effect on the concentration of CO in the outlet gas stream, which remained almost constant at 15 ppm.

However when the concentration of $CO_2$ in the reformate was reduced from 15 to 5% (dry basis), then the CO in the product dropped to 5 ppm at an $O_2/CO$ ratio of 2:1. These results are consistent with the behavior of the reverse water-gas shift reaction. The data shows that operation of the platinum-based, iron promoted monolith catalyst preferential oxidation catalyst at low space velocity and high $CO_2$ is contraindicated when trying to achieve 10 ppm of CO in the outlet gas stream.

EXAMPLE 8

Effect of Varying Platinum Metal Concentration on the Performance of Copper-based Catalysts The effect of varying platinum concentration on Catalyst B performance was evaluated using a test gas composition containing 360 ppm CO, 15% $CO_2$, 50% $H_2$, and the balance $N_2$. Steam (25%) was added as a diluent. Catalyst B2 (impregnated with 0.25 wt. % Pt) was prepared according to Example 1. The influence of temperature was evaluated first. At an $O_2/CO$ ratio of 3, good activity (>90% CO conversion) was observed above 115° C. at 17 k/hr. The catalyst became stable with a CO concentration of 6 ppm in the outlet gas stream at an $O_2/CO$ ratio of 6.7 at 135° C. At 130° C. with $O_2/CO$ ratios of 5.4 and 6.1, some degree of upward shift in the outlet CO concentration was observed, a phenomenon normally associated with catalyst inhibition.

Another copper-based catalyst was prepared according to Example 1, with 0.125 wt. % platinum impregnated in the catalyst. This is catalyst B3. The experiment with the same test gas composition was repeated with Catalyst B3. At this level, the platinum was basically innocuous, and activation occurred slowly at ~140° C., similar to the data shown in FIG. 2.

The effect of the concentration of platinum on Catalyst B performance is summarized in Table 2.

TABLE 2

| Catalyst (% Pt) | Temperature for 90% Conversion of CO |
| --- | --- |
| Catalyst C (No Platinum) | 140° C. |
| Catalyst B3 (0.125 wt. %) | 140° C. |
| Catalyst B2 (0.25 wt. %) | 115° C. |
| Catalyst B1 (0.50 wt. %) | 90° C. |

As can be seen in this Table 2, the addition of as little as 0.25 wt. % of platinum to the copper-cerium oxide catalyst composition effectively widens the operating window at which selective CO oxidation can be conducted.

EXAMPLE 9

Preparation of Copper Oxide/Cerium Oxide/ Platinum/Alumina Preferential Oxidation Catalysts (Exemplifies Preparation of High Heat Capacity, High-mechanical Strength Embodiments of Catalyst A)

To prepare a catalyst wherein the support is alumina, the reducible metal oxide is ceria and the catalytic agent is CuO, ceria impregnated alumina support particles were prepared by incipient wetness impregnation of alumina beads or particulates.

⅛-inch alumina support particles (ALCOA DD-443) were dried for 2 hours at 200° C. and then calcined for 2 hours at 500° C. The calcined ⅛-inch particles were then impregnated (i.e., impregnated at 55% incipient wetness to obtain about 15 wt. % $CeO_2$) in an aqueous solution of cerium nitrate (i.e., $Ce(NO_3)_3$,; 33.44 g $Ce(NO_3)_3$ dissolved in 55 g water, per 100 g alumina). The particles were then dried at 120° C. for 8 hours. The sample was then calcined at 500° C. for 2 hours.

The ceria/alumina particles were subsequently impregnated (i.e., impregnated at 44% incipient wetness to obtain 8.25 wt. % CuO) with Cu-nitrate solution (i.e., 26.6 mL of 5M $Cu(NO_3)_2$ solution in 32 mL deionized water) at a pH of 6, dried at 120° C. for 8 hours and then calcined at 500° C. for 2 hours to prepare catalyst precursor particles (CuO/ceria/alumina particles).

The CuO/ceria/alumina particles were then impregnated with alkali-free amine-solubilized platinum hydroxide. 0.357 g of salt solution was diluted with 15.75 mL of water and used to impregnate 51.15 g of precursor particles of water was used to prepare a catalyst containing 0.125 wt. % Pt. The beads were treated with 6.9 mL of acetic acid to immobilize the platinum. After impregnation, the catalysts was dried at 120° C. for 2 hours then calcined at 500° C. for 2 hours.

The resulting alumina particles contained 8.25 wt. % CuO, 15 wt. % $CeO_2$, and 0.125 wt. % Pt. This is catalyst A1.

Alumina particles of the same material were also impregnated above to obtain a catalyst with a higher Pt concentration, i.e. 0.25 wt. %. This catalyst contained 8.25 wt. % CuO, 15 wt. % $CeO_2$, and 0.25 wt. % Pt. This is catalyst A2.

A control catalyst of the same material was prepared without any added platinum. This catalyst contained 8.25 wt. % CuO, 15 wt. % $CeO_2$, and contained no platinum. This is catalyst D.

EXAMPLE 10

Determination of CO Conversion Using Catalyst of Example 1 (Exemplifies Catalyst Performance of of High Heat Capacity, High-mechanical Strength Embodiments of Catalyst A)

The catalyst performance of Catalyst A1 catalyst of Example 9 was evaluated using a test gas composition containing 5000 ppm CO, 15% $CO_2$, 50% $H_2$, and the balance $N_2$. Steam (25%) was added as a diluent. The catalyst beads were placed in a quartz tube reactor and exposed to the test gas. Oxidation began at the minimum temperature measured, 90° C. The catalyst performance was determined as the WHSV was varied from 10–20 k L/kg·hr. The inlet temperature and the $O_2$ inlet concentration was adjusted to yield a product gas stable with respect to outlet CO concentration.

TABLE 3

| Space Velocity (WHSV, L/kg · hr) | Inlet Temp. | Inlet CO$_2$ Concentration | Inlet O$_2$ Concentration | Percentage CO Conversion | Outlet CO Concentration |
|---|---|---|---|---|---|
| 10k | 110° C. | 5000 ppm | 7500 ppm | 96% | 200 ppm |
| 10k | 125° C. | 5000 ppm | 7500 ppm | 88% | 600 ppm |
| 15k | 125° C. | 5000 ppm | 7000 ppm | 90% | 500 ppm |
| 20k | 125° C. | 5000 ppm | 4600 ppm | 74.5% | 1275 ppm |
| 20k | 125° C. | 5000 ppm | 7000 ppm | 89.5% | 525 ppm |

The data presented in Table 3 exemplifies the locus of conditions (temperature and space velocity) that are characteristic of Catalyst A1's performance. For example, at 110° C. and a space velocity of 10 k L/kg·hr, >95% conversion of the inlet CO can be achieved.

EXAMPLE 11

Comparative Catalyst Performance of Catalyst A with a Conventional Platinum-based Catalyst (0.5 wt. % Platinum, 0.03 wt. % Iron on Alumina)

The catalyst performance of a 0.5 wt. % platinum, 0.03 wt. % iron on alumina tablets was evaluated for comparative purposes. A two bed arrangement of the catalyst was used. The first bed operated at 105° C. near 10 k L/hr·kg with an inlet gas composition containing 0.5% CO, 0.63% O$_2$, 50% H$_2$, 15% CO$_2$ and the balance was N$_2$. Steam (25%) was added as a diluent. The second bed ran at 85° C. and 10 k L/hr·kg with 0.3% O$_2$ added. The concentration of CO$_2$ in the output gas stream from the first bed was ~170 ppm, while the CO$_2$ concentration in the output gas from the second bed was 6–10 ppm.

The above experiment was repeated using a first bed containing Catalyst A2 (with 0.125 wt. % Pt) of Example 9 and the second bed containing Catalyst A1 (with 0.125 wt. % Pt). The flow of the test gas was adjusted to achieve the same WHSV as above. At the same bed operating temperatures as above, the outlet CO concentration of the first bed was 170 ppm, and the outlet CO concentration for the second bed was 3.5 ppm. It is particularly noteworthy that the removal of CO from the hydrogen stream was achieved using a weighted platinum reduction of 62% for the copper-based catalysts of the invention as compared to the conventional platinum-based catalyst.

The experiment was repeated with both beds containing Catalyst A1. At the same operating bed temperatures as above, the outlet CO concentration of the first bed was 120 ppm, and the outlet CO concentration for the second bed was 3 ppm. In this case the removal of the CO from the hydrogen stream was achieved using a weighted platinum reduction of 75% as compared to the conventional platinum-based catalyst. The platinum group metal reductions translate into significant savings in material costs.

The results of the comparison are summarized in Table 4.

TABLE 4

| First Bed Catalyst (105° C.) | Outlet CO from First Bed | Second Bed Catalyst (85° C.) | Outlet CO from Second Bed |
|---|---|---|---|
| 0.5 wt. % Pt/0.03 wt. %/Al$_2$O$_3$ | 170 ppm | 0.5 wt. % Pt/0.03 wt. %/Al$_2$O$_3$ | 6–10 ppm |
| Catalyst A2 (0.25 wt. % Pt) | 170 ppm | Catalyst A1 (0.125 wt. % Pt) | 3.5 ppm |
| Catalyst A1 (0.125 wt. % Pt) | 120 ppm | Catalyst A1 (0.125 wt. % Pt) | 3 ppm |

EXAMPLE 12

Comparative Performance of Catalyst D

The experiment of Example 11 was repeated using a single bed of Catalyst D of Example 9 (containing no platinum), with only 0.5% O$_2$ added to the input gas stream. Catalyst D had no activity until 140° C. The activity increased with temperature, but CO conversion never surpassed 60%, compared with the 97%+ obtained for catalyst A1 (shown above).

When this single bed experiment was repeated using Catalyst A1 of Example 9, containing 0.125 wt. % Pt (with 0.5% CO and O$_2$ in the inlet gas), 90% CO conversion was achieved at an operating temperature of 105° C. The inclusion of platinum, even at this low level of 0.125 wt. % significantly improves the percentage of CO converted at lower operating temperatures.

EXAMPLE 13

Comparative Catalyst Performance of Catalyst A1 Versus Conventional Platinum-based Catalysts at Higher CO Inlet Percentages (i.e. 2% CO)

A two bed catalyst arrangement was tested using 0.5 wt. % platinum, 0.03 wt. % iron on alumina tablets in each bed. A test gas composition of 2% CO, 15% CO$_2$, 50% H$_2$, and the balance was N$_2$. Steam (25%) was added as a diluent. The space velocity for the first bed was 11 k L/kg·hr and 13 k L/kg·hr for the second bed. Air was added so that the inlet O$_2$/CO ratio for the first bed was about 0.45. The inlet temperature was increased incrementally from 120 to 160° C., primarily because of evidence of catalyst inhibition at lower temperatures. The outlet concentration of the first bed was ~1.2% CO, equal to a 40% conversion. The O$_2$ entering the second bed, both from unreacted O$_2$ and freshly injected air, was 0.43%. The CO was further reduced to 4500 ppm in the outlet gas from the second bed at a temperature of 140° C. The overall CO reduction for the two beds was ~77%. Better selectivity was achieved at lower inlet temperatures, but the catalyst passed increasing amounts of CO, a sign that the catalyst performance was decaying.

The experiment was repeated using the Catalyst A1 of Example 9 in each bed. The test gas composition was the same except that the space velocity was increased for technical reasons. The first catalyst bed was run at 130° C. and the second bed was run at 120° C. With the same concentrations of CO and $O_2$ in the inlet gas stream, the CO concentration detected in the outlet gas stream from the first bed was 9200 ppm, while the CO concentration detected for the second bed was 1850 ppm. The detected CO concentrations corresponds to a 54% conversion in the first bed and a 91% conversion after two beds. This is a significantly better conversion than achieved using the 0.5 wt. % platinum, 0.03 wt. % iron on alumina catalyst.

In addition, Catalyst A1 was shown to have a tolerant operating window. For example, using the test gas composition described above, containing 2% CO, the first bed was operated at 160° C. to yield an outlet CO concentration from the first bed of 1% CO. This CO conversion of 50% is still better than that achieved by the iron promoted, platinum on alumina catalyst. The result also illustrates the small change in CO selectivity for Catalyst A1 as a function of temperature. Catalyst A1 was further tested at 120° C., and the outlet CO concentration decreased to 8900 ppm, or a CO conversion of 55%.

In summary, at 2% CO inlet concentration, the preferential oxidation Catalyst A1, containing 0.125 wt. % Pt, shows superior CO conversions, with lower material costs than the 0.5 wt. % platinum, 0.03 wt. % iron on alumina tablets. Moreover, the temperature window for stable operation of the catalyst of the invention is large.

EXAMPLE 14

For comparative purposes, an experiment was conducted using commercially available 0.5% Pt on alumina pellets (Engelhard Corporation). 24 g of the pellets were loaded into a quartz reactor and run with a reformate having a dry basis composition of 50% $H_2$, 15% $CO_2$ and balance $N_2$, with 25% added steam at a WHSV of 10 k/hr. The first run was conducted with 3000 ppm CO and an $O_2$/CO ratio of 1.1. The temperature was increased from 120 to 180° C. In the second run, CO was increased to 5000 ppm, while the $O_2$/CO ratio was adjusted to 0.9, a reflection of an increase in selectivity associated with a higher CO inlet concentration. Table 5 below demonstrates the influence of temperature on CO conversion.

TABLE 5

| Inlet CO Concentration (ppm) | Inlet Temperature | Outlet CO Concentration (ppm) | % CO Conversion |
| --- | --- | --- | --- |
| 3000 (with $O_2$/CO = 1.1) | 120° C. | 1050 | 65.0 |
| | 130° C. | 910 | 69.7 |
| | 140° C. | 690 | 77.0 |
| | 150° C. | 420 | 86.0 |
| | 160° C. | 240 | 92.0 |
| | 170° C. | 175 | 94.2 |
| | 180° C. | 175 | 94.2 |
| 5000 (with $O_2$/CO = 0.9) | 150° C. | 1550 | 69.0 |
| | 160° C. | 1300 | 74.0 |
| | 170° C. | 1000 | 80.0 |
| | 180° C. | 700 | 86.0 |
| | 190° C. | 625 | 87.5 |
| | 200° C. | 625 | 87.5 |

As is apparent from the data presented in Table 5, 0.5% Pt/alumina pellets show a high dependence on temperature in the oxidation of CO. Optimal operating temperature for 0.5% Pt/alumina pellets were 180–200° C. In comparison, Catalyst A1 (CuO/CeO$_2$/Pt/alumina beads) run optimally closer to 100° C. as was observed in Examples 10 and 11. For low temperature applications, such as a preferential oxidation catalyst polishing bed, the former is not usable because of the propensity of a platinum-based catalyst to promote reverse water gas shift at high temperature (at 10 k/hr and 200° C., a value of 275 ppm CO was observed based on reverse water gas shift)

With a CO inlet concentration of 5000 ppm, the maximum CO conversion was 87.5% using 0.5% Pt/alumina pellets. In a similar experiment performed with catalyst A1 containing 0.125% Pt, CO outlet concentration was 120 (as described in Example 11).

What is claimed:

1. A process for selectively oxidizing carbon monoxide from an input gas stream comprising carbon monoxide, oxygen and hydrogen, comprising: contacting the input gas stream with a preferential oxidation catalyst, wherein the preferential oxidation catalyst comprises:
   at least 50 wt. % of an oxide support selected from the group consisting of activated alumina, zirconia, titania, silica, zeolites, zinc oxide and combinations thereof;
   copper or an oxide thereof dispersed on the oxide support;
   0.01 to 0.5 wt. % of a platinum group metal selected from the group consisting of platinum, palladium, rhodium, osmium, iridium, ruthenium and combinations thereof dispersed on the oxide support; and
   cerium oxide dispersed on the oxide support.

2. The process of claim 1, wherein the platinum group metal comprises platinum.

3. The process of claim 1, wherein there is at least 5 wt. % copper or an oxide thereof dispersed on the oxide support.

4. The process of claim 1, wherein the support comprises activated alumina.

5. A process for selectively oxidizing carbon monoxide from an input gas stream comprising carbon monoxide, oxygen and hydrogen, comprising: contacting the input gas stream with a preferential oxidation catalyst, wherein the preferential oxidation catalyst comprises:
   at least 50 wt. % of an alumina support;
   copper or an oxide thereof dispersed on the alumina support;
   0.01 to 0.5 wt. % of platinum on the alumina support; and
   cerium oxide dispersed on the alumina support.

6. The process of claim 5, wherein there is at least 10 wt. % cerium oxide in the preferential oxidation catalyst.

7. The process of claim 5, wherein
   the support comprises at least 65 wt. % of activated alumina;
   there is at least 5 wt. % copper or an oxide;
   there is at least 10 wt. % cerium oxide;
   the platinum group metal comprises platinum; and
   there is at least 10 wt. % cerium oxide in the preferential oxidation catalyst.

8. The process of claim 5, wherein the alumina support is in the form of particles having a mesh size of 12 or greater, and a BET surface area of 10 m$^2$/g or greater.

9. The process of claim 5, wherein the preferential oxidation catalyst is in the form of a washcoat composition deposited on a monolith substrate.

10. The process of claim 5, wherein there is at least 10% by volume hydrogen in the input gas stream.

11. The process of claim 5, wherein the $O_2$/CO ratio in the input gas stream is about 0.25 to 5.

12. The process of claim 5, wherein the input gas stream further comprises steam.

13. The process of claim 5, wherein the contacting is conducted at a temperature of about 80° C. to about 160° C.

14. A process for selectively oxidizing carbon monoxide from an input gas stream comprising carbon monoxide, oxygen and hydrogen, comprising: contacting the input gas stream with a preferential oxidation catalyst, wherein the preferential oxidation catalyst comprises:

a cerium oxide support;

copper or an oxide thereof dispersed on the cerium oxide support; and 0.2 wt. % or more of a platinum group metal selected from the group consisting of platinum, palladium, rhodium, osmium, iridium, ruthenium and combinations thereof dispersed on the cerium oxide support.

15. The process of claim 14, wherein the platinum group metal comprises platinum.

16. The process of claim 15, wherein there is:

5 to 14 wt. % of copper or an oxide thereof dispersed on the cerium oxide support; and 0.2 to 5 wt. % platinum dispersed on the cerium oxide support in the preferential oxidation catalyst.

17. The process of claim 14, wherein the preferential oxidation catalyst is in the form of a washcoat composition deposited on a monolith.

18. The process of claim 14, wherein the $O_2/CO$ mole ratio in the input gas stream is about 0.25 to about 5.

19. The process of claim 14, wherein there is at least 10% by volume hydrogen in the input gas stream.

20. The process of claim 14, wherein the input gas stream further comprises steam.

21. The process of claim 14, wherein the contacting is conducted at a temperature between 80 to 160° C.

* * * * *